June 14, 1927. M. SCHWARTZ Re. 16,659
DIE MECHANISM
Original Filed Dec. 10, 1923
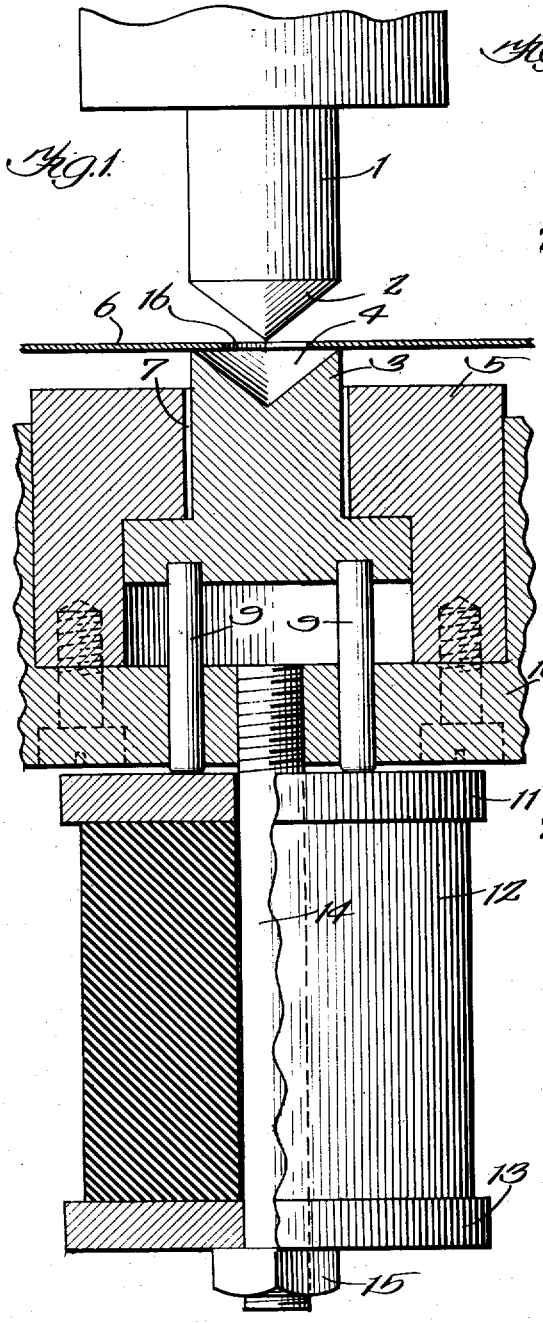
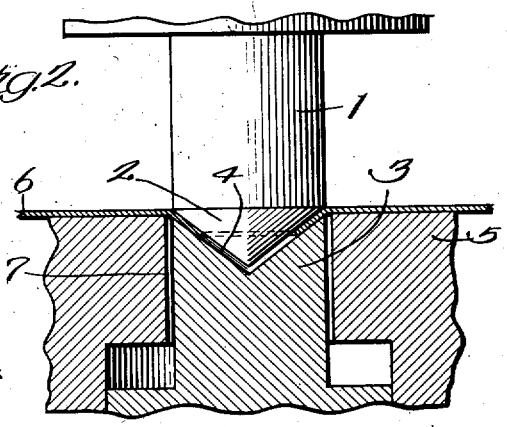
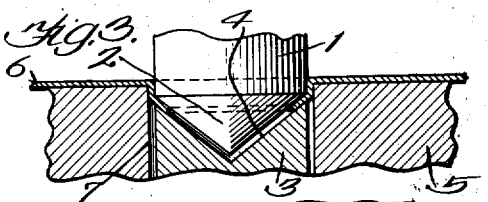
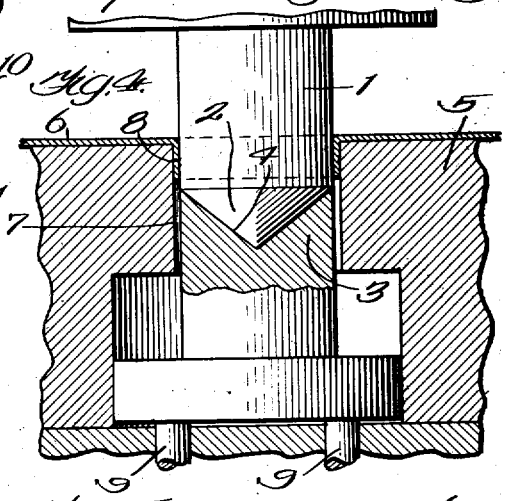
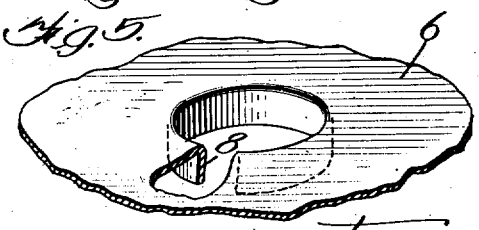
Inventor:
Morris Schwartz
By R. R. Bragg Atty.

Reissued June 14, 1927. Re. 16,659

UNITED STATES PATENT OFFICE.

MORRIS SCHWARTZ, OF CHICAGO, ILLINOIS, ASSIGNOR OF ONE-HALF TO WINNIFRED B. PARISH, OF CHICAGO, ILLINOIS.

DIE MECHANISM.

Original No. 1,613,961, dated January 11, 1927, Serial No. 679,796, filed December 10, 1923. Application for reissue filed January 31, 1927. Serial No. 164,997.

My invention resides in an improved die mechanism adapted to the formation of hollow extensions of bodies of sheet material.

The mechanism of my invention enables the formation of such extensions without cracks or fissures in the product. The mechanism of my invention includes male and female members and a spring yieldingly pressing one of the die members toward the other with a pressure sufficient to exert drawing engagement of the die members upon the material interposed therebetween.

My invention is of particular service in the formation of tubular or cylindrical projections, and when thus employed the male member is in the form of a cylindrical punch having a conical working end and the female member is provided with a conical cavity conforming in shape to the conical end of the punch.

Hitherto there was no tendency to draw the sheet material as the punch descended with the result that fissures were liable to form at the bases of the extension.

By gripping the work between the two die members the sheet material is drawn as the die operates thereon to relieve the fissure-forming tendency.

The invention will be more fully explained by reference to the accompanying drawing, in which Fig. 1 is a view partially in section and partially in elevation of the preferred form of mechanism, the die members being in separated relation; Fig. 2 illustrates the punch and female member of the die in the early stage of an operation; Fig. 3 illustrates a later stage in the operation; Fig. 4 illustrates the final stage in the operation; and Fig. 5 is a perspective view illustrating the resulting product.

Like parts are indicated by similar characters of reference throughout the different figures.

The male member 1 is shown in the form of a cylindrical punch having a tapering or conical working end 2. The female member 3 is also preferably, though not necessarily, cylindrical. This female member is formed with a tapering or conical cavity that conforms in shape to the conical punch end 2. There is a support 5 for the sheet material (illustrated at 6) that is to be operated upon. This support is formed with a cylindrical opening 7 which is of a diameter conforming to the external diameter of the tubular extension 8 (Fig. 5) that is to be formed. The punch 1 conforms in size to the bore of the tubular extension 8. The annular clearance between the punch 1 and support 5 is substantially equal to the thickness of the sheet metal from which said tubular extension is formed. Both die members are adapted to reciprocate in this opening in performing their function. The die member 3 carries vertical pins 9 which project downwardly from the base thereof, these pins sliding in vertical holes formed in the mounting 10 for the support 5. These pins bear upon a metal plate 11 which bears upon the top end of a spring cushion 12 which is preferably a body of rubber. This body of rubber is held in assembly with the plate 11 by means of the plate 13 engaging the bottom spring cushion, a bolt 14 screwed in the part 10, and a nut 15 upon the lower end of the bolt, this nut clamping the cushion 12 between the plates 11 and 13.

As illustrated, the members of the die are vertically arranged, the female member 3 and its supporting cushion 12 being lowermost. This cushion exerts sufficient pressure to clamp the sheet metal 6, or other sheet material, between the punch and female member with sufficient force to cause the metal to be drawn downwardly as well as otherwise to be subject to the punching operation, whereby the sleeve 8 may be formed without the presence of fissures at its base.

I prefer to form a circular hole 16 in the sheet metal, there being left sufficient metal between this hole and the border of the opening 7 to form a sleeve 8 of the desired length when this much of the metal is added to by the metal drawn from the surrounding body of the sheet material.

While I have herein shown and particularly described the preferred embodiment of my invention I do not wish to be limited to the precise details of construction shown, as changes may readily be made without departing from the spirit of my invention; but having thus described my invention, I claim as new and desire to secure by Letters Patent the following:—

Die mechanism for shaping sheet material, including a support for the sheet material; a male die member in the form of a punch upon the exterior of said support and having a tapering working end; a female die member having a tapering cavity receiving the tapering end of the punch and normally received in an opening in said support, and in which opening both die members are reciprocable, and between which support and the punch member a clearance, substantially equal to the thickness of the sheet material being operated upon, intervenes to receive the sheet material being worked upon; and means for maintaining clamping engagement of said die members with the sheet material after the initial punching operation, to enable the sheet material to be drawn by the die members into said clearance as said die members move together.

In witness whereof, I hereunto subscribe my name.

MORRIS SCHWARTZ.